United States Patent [19]

Shimizu et al.

[11] 4,200,971
[45] May 6, 1980

[54] METHOD OF MANUFACTURING CUP-SHAPED COIL ASSEMBLY OF ELECTRIC MOTORS

[75] Inventors: Makoto Shimizu; Kunikazu Shirakawa, both of Maruko, Japan

[73] Assignee: Shinano Kenshi Co., Ltd., Japan

[21] Appl. No.: 906,558

[22] Filed: May 16, 1978

[30] Foreign Application Priority Data

May 17, 1977 [JP] Japan .................................. 52-56025

[51] Int. Cl.² ........................................... H02K 15/02
[52] U.S. Cl. ........................................ 29/598; 29/605; 72/62; 72/75; 72/120; 310/266
[58] Field of Search .................. 29/598, 605; 310/266; 72/62, 75, 120, 123

[56] References Cited

U.S. PATENT DOCUMENTS

| | | | |
|---|---|---|---|
| 2,513,410 | 7/1950 | Haydon | 310/266 |
| 2,759,116 | 8/1956 | Glass | 29/598 |
| 3,971,124 | 7/1976 | Sasaki et al. | 29/598 |

FOREIGN PATENT DOCUMENTS 1021466 6/1958 Fed. Rep. of Germany .

Primary Examiner—Carl E. Hall
Attorney, Agent, or Firm—Robert E. Burns; Emmanuel J. Lobato; Bruce L. Adams

[57] ABSTRACT

A method of manufacturing a cup-shaped coil assembly is described which employs a coil bobbin of a special design. The bobbin comprises a cylindrical member, a disc connected with one end of the cylindrical member to close it, a cap member detachably fitted into an opening in the other end of the cylindrical member, and a shaft disposed in alignment with the axis of the cylindrical member and having its one end attached to the disc and its other end slidably extending through the cap member. The method comprises the steps of assembling a coil bobbin in the manner mentioned above, and forming a coil around the bobbin by a skewed winding of wire, pressing the cap member into the cylindrical member, diametrically enlarging an opening formed at one end of the coil, and removing the cap member from the coil formed.

8 Claims, 11 Drawing Figures

METHOD OF MANUFACTURING CUP-SHAPED COIL ASSEMBLY OF ELECTRIC MOTORS

FIELD OF THE INVENTION

The invention relates to a method of manufacturing a coreless rotor of electric motors, and more particularly, to a method of manufacturing a cup-shaped coil assembly of a rotor which is open at one end and which is closed at its other end by the coil wire.

DESCRIPTION OF PRIOR ART

A design of electric motor is known which includes a coreless rotor formed by a cylindrical winding of wire and also includes a stator comprising a field magnet or field yoke disposed so that the rotor can rotate around the stator. One method of manufacturing such rotor is disclosed in Japanese Patent Publication No. 2421/1960, for example. Specifically, a flat circular coil having a desired number of turns is formed, and then placed in a suitable arrangement to be shaped into a coil element of a given configuration. A plurality of such coil elements are assembled together into a hollow cylinder, which is then subjected to one or a plurality of pressure forming steps, followed by molding it in a synthetic resin material to provide a cup-shaped coil assembly. The manufacture of a coil according to such method is troublesome, and the formed coil tends to deform when it is to be molded subsequent to the pressure forming step. Additionally, the combination of the plurality of coil elements results in a non-uniform coil thickness due to the overlaps between the elements. Consequently, an air gap between the resulting coil and the permanent magnet of the stator tends to increase.

As an alternative, a skewed winding approach has been proposed in which a coil wire starts from the center of one end face of a cylindrical coil bobbin, extends down the peripheral surface of the bobbin in a skewed manner with respect to the axis, passes through the center of the other end face of the bobbin and extends upwardly around the peripheral surface toward the starting point, thereby completing one turn. A second and subsequent turns are formed in a similar manner by disposing them adjacent to the previous coil wire, but crossing the latter in the proximity of the center of the respective end faces of the bobbin. The skewed winding advantageously achieves an efficient utilization of the coil area. However, since the coil formed represents a winding structure which is closed at its opposite end faces, as shown in U.S. Pat. No. 2,513,410, the coil winding has to be formed after the stator has been assembled into the coil bobbin. This reduces the operational efficiency during the manufacture of electric motors.

SUMMARY OF THE INVENTION

It is an object of the invention to provide a method of manufacturing a coreless rotor of an electric motor with simple process steps and in a manner to permit a subsequent insertion of a stator into the rotor.

It is another object of the invention to provide a method of manufacturing a cup-shaped coil assembly which is simple in operation and which assures a good winding accuracy.

It is a further object of the invention to provide a method of manufacturing a cup-shaped coil assembly a uniform radial thickness which enables the air gap between the coil and the permanent magnet to be reduced, thus allowing an improvement in the output response of the electric motor.

It is still another object of the invention to provide a method of manufacturing a cup-shaped coil assembly which is firmly bonded together, thus preventing deformation of a configuration if the coil bobbin is removed.

It is a still further object of the invention to provide a cup-shaped coil assembly which is open at its one axial end and which includes a plurality of tires of a coil wire which is disposed in a skewed winding around the peripheral surface with a close spacing between adjacent turns.

In accordance with the invention, there is provided a method of manufacturing a cup-shaped coil assembly for an electric motor which includes a cup-shaped coil having its one end left open and its other end closed by a coil wire and also including an output shaft which extends through the coil in the axial direction thereof, wherein the method comprising the steps of assembling a coil bobbin assembly which includes a cylindrical member, a disc connected with one end of the cylindrical member to close it, a cap member adapted to be fitted into an opening in the other end of the cylindrical member, and an output shaft disposed in alignment with the axis of the cylindrical member and having its one end mounted in the disc and its other end extending through the cap member, the disc and the cap member being centrally formed with an outwardly projecting boss, providing a skewed winding of wire around the boss of the disc and the boss of the cap member to thereby form a coil, moving the cap member into the cylindrical member to leave an opening in one end face of the coil which is created by the boss of the cap member, enlarging the opening outwardly to provide an open end of the coil, and removing the cap member from the coil.

Preferably the cup-shaped coil assembly thus formed is shaped by pressing the outer profile of the coil while maintaining the cylindrical member in a solid condition. The coil wires or turns of the shaped coil are bonded together with a resin or adhesive which does not attack the insulating film.

Above and other objects and features of the invention will become apparent from the following detailed description of embodiments thereof with reference to the drawings.

DESCRIPTION OF PREFERRED EMBODIMENTS

Figure 1:
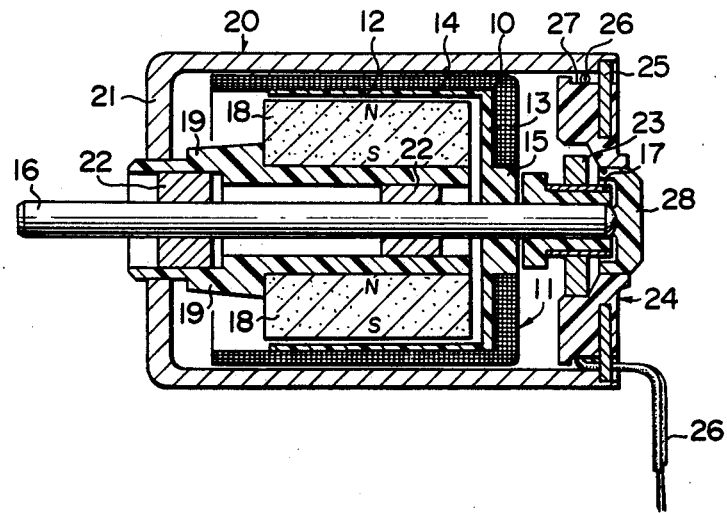
FIG. 1 is a longitudinal section, partly in elevation, of an electric motor incorporating a cup-shaped coil assembly constructed according to one embodiment of the invention.

Referring to FIG. 1, there is shown an electric motor incorporating a cup-shaped coil assembly 11 which is constructed in accordance with the invention. The assembly 11 comprises a coil bobbin 10 including a cylindrical member 12 and a disc 13 connected to close one open end of the member 12. The assembly also comprises a coil 14 which is continuously disposed around the bobbin 10. The disc 13 is formed with an outwardly projecting boss 15 in coaxial relationship. The boss is formed with a central opening in which an output shaft 16 extending axially of the cylindrical member 12 is rigidly attached. One end of the shaft 16 has a commutator 17 mounted thereon, and the terminal end of which projects beyond the commutator 17 and is formed as a spherical surface.

A stator comprising an annular permanent magnet 18 which is magnetized to define a plurality of poles is received inside the cylindrical member 12 and mounted around a hollow cylindrical stator support 19, which is in turn rigidly secured to an end wall 21 of a cup-shaped casing 20 as by threadable engagement or by nut. A pair of bearings 22 are spaced apart within the stator support 19 and rotatably support the output shaft 16. The other end of the shaft 16 extends through the endwall 21 of the casing 20.

A brush assembly 23 which cooperates with the commutator 17 is carried by a brush holder 24, which is disposed in an open end of the casing 20. An annular metal plate 25 is embedded in the periphery of the holder 24 and is secured to the open end of the casing as by caulking, whereby the holder 24 is fixedly mounted on the casing 20. A recess 27 is formed around the brush holder 24 to pass lead wires 26 associated with the brushes. The brush holder 24 is centrally formed with an opening in which is fitted a bearing cap 28, which rotatably engages the spherical edge of the output shaft 16.

Figure 2:
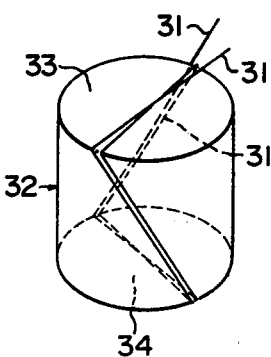
FIG. 2 is an illustration of the skewed winding.
Figure 3:
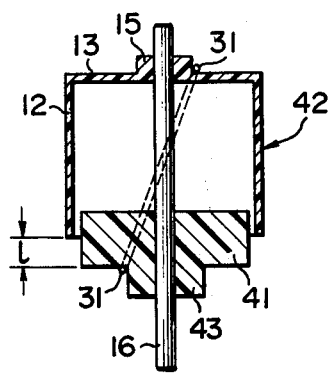
FIG. 3 is a cross section illustrating skewed winding of a wire around a coil bobbin.

Before describing the detail of the cup-shaped coil assembly 11, a skewed winding will be briefly described with reference to FIG. 2. As shown, a wire 31 which forms the coil 14 initially extends substantially through the center of an upper end face 33 of a cylinder 32, and then extends down the peripheral surface of the cylinder 32 in a skewed manner with respect to the axis, extends substantially through the center of the lower end face 34 and finally extends upward along the peripheral surface toward the starting point 35, again in a skewed manner with respect to the axis, thus completing one turn. A second turn is formed by passing the wire 31 in the similar manner as before and in close proximity to the previous turn, but crossing the latter substantially at the center of the upper and lower end faces. It should be understood that while the wires of successive turns are shown as crossing substantially at the center of the end faces for purposes of illustration, they close at positions offset from such center actually.

In the manufacture of the coil assembly, the invention employs a coil bobbin assembly 42 which includes a cap member 41 of an outer diameter less than the inner diameter of the cylindrical member 12 and which is fitted into the open end thereof. The cap member 41 is centrally formed with a boss 43 of a greater diameter than the boss 15 of the disc 13 and is positioned to project a length l from the open edge of the cylindrical member 12. By using a coil winding machine of a known form to hold the both bosses 15, 43 with chucks thereof, not shown, a skewed winding of wire 31 is formed in the manner mentioned above. The wire 31 is guided across the disc 13 and cap member 41 so as to extend around the periphery of the bosses 15, 43, thus preventing the bosses from being covered with the coil winding. In this manner, a hollow coil 41 which is closed at its opposite ends is formed.

Figure 4:
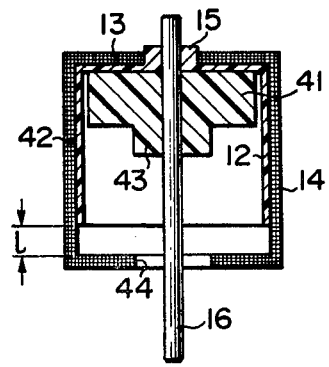
FIG. 4 shows a completed coil, with a cap member pressed into the bobbin.

After removing the coil 14 from the winding machine, the cap member 41 is moved into abutment against the disc 13 as shown in FIG. 4, thereby leaving an opening 44 in the end of the coil 14 which is formed by the boss 43. The coil 14 of the configuration shown in FIG. 1 is formed by enlarging the opening 44 outwardly.

Figure 5:
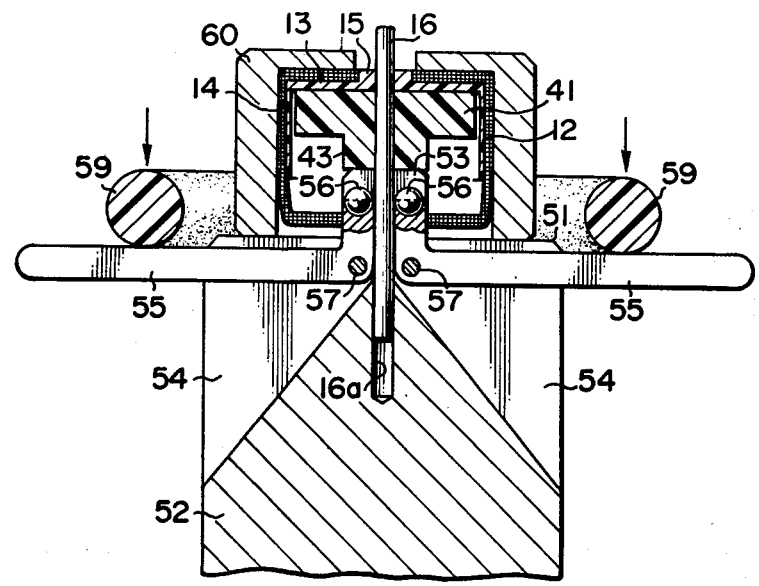
FIG. 5 is a schematic view of an enlarging apparatus which serves enlarging an opening formed in the coil.
Figure 6:
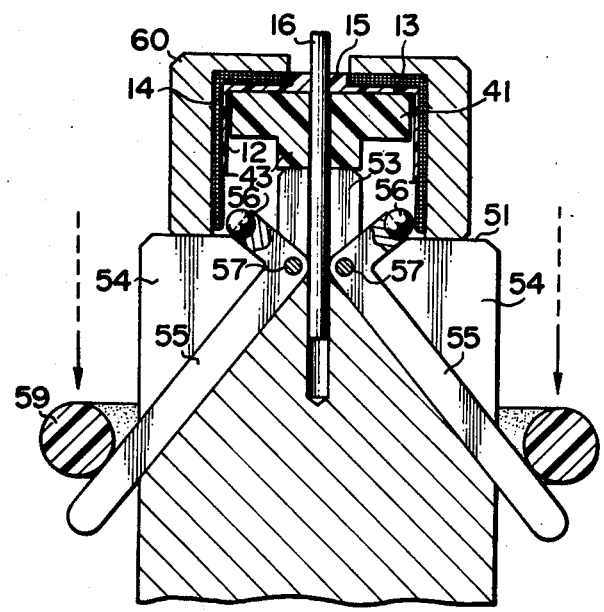
FIG. 6 is an operative condition of the enlarging apparatus shown in FIG. 5.

FIGS. 5 and 6 show one form of enlarging apparatus which is used to enlarge the opening 44 formed in the coil 14. The apparatus comprises a turntable 52, on upper end face 51 of which is placed the coil shown in FIG. 4. The end face 51 is centrally formed with an integral rest 53 which is adapted to engage the boss 43 and to drive it upward. A pair of diameterically extending notches 54 are formed in the top of the turntable 52, and receive a pair of rockable shaping levers 55. The turntable 52 is centrally formed with an axially extending bore 16a, into which the output shaft 16 of the coil assembly is fitted. Each shaping lever 55 is L-shaped, having its one end rotatably carrying a ball 56. The bend of each shaping lever 55 is pivotally mounted on a pin 57 which has its opposite ends mounted in the turntable 52. When the levers 55 assume a horizontal position shown in FIG. 5, the short arms of the levers 55 are received in the opening 44 and hold the output shaft 16 sandwiched therebetween. A pressure ring 59 of an inner diameter greater than the diameter of the turntable 52 and which is circular in cross section is placed on top of the shaping levers 55 in their horizontal position. A shaping ring 60 having an inner diameter which is slightly less than the outer diameter of the coil is fitted over the coil which has been placed on the upper end face 51 of the turntable 52. Thus the coil can be shaped simultaneously with the enlargement of the opening 44.

Specifically, the shaping levers 55 are initially placed in their horizontal position shown in FIG. 5, the rest 53 is fitted into the opening 44 in the coil 14 to maintain the cap member 41 in its upper postion. The shaping ring 60 is fitted over the coil and is secured in position by a suitable device, not shown. The turntable is then set in rotation by drive means, not shown. Since the shaping ring 60 is fixed, only the cap member 41 placed on top of the rest 53 rotates as the turntable 54 rotates. Subsequently, the ring member 59 is driven downward as indicated by arrows in FIG. 5, whereupon the shaping levers 55 rocks in the downward direction about the pins 57. As a consequence, the balls 56 on the shaping levers 55 more into engagement with the inner surface of the coil 14 while rotating, thus gradually spreading the lower end of the coil outward. When the shaping levers 55 are fully depressed as shown in FIG. 6, the opening 44 is enlarged to a diameter which is substantially equal to that of the cylindrical member 12. The circular cross-sectional area of the pressure ring 59 has a minimum area of contact with the rotaing shaping levers 55, thus avoiding an interference with the rotation of the levers.

The shaping levers 55 may be formed of a material having a reduced coefficient of friction, thus minimizing the friction between the levers 55 and the ring 59.

After the termination of the enlarging and shaping steps, the coil is removed from the enlarging apparatus and the shaping ring 60, and the cap member 41 is withdrawn through the enlarged opening 44. Subsequently, rubber, polyamide or epoxy adhesive which does not attack the insulating film on the coil wire 31 is utilized to bond the wire 31 together, thus providing a shaped and firmly bonded, cup-shaped coil assembly 11.

Figure 7:
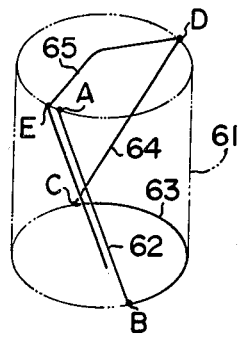
FIG. 7 is a schematic illustration of turns of a completed coil.

As indicated in FIG. 7, each coil turn of the cup-shaped coil assembly comprises a first segment 62 which extends around the peripheral surface of the cylinder from a first point A on one edge of an imaginary cylinder 61 having a volume corresponding to the interior space of the coil, to a second point B located on the other edge of the cylinder and phase advanced relative to the first point A, a second segment 63 which extends along the other edge of the cylinder from second point B to a third point C which is phase advanced with respect to the latter, a third segment 64 which extends around the peripheral surface of the cylinder 61 from the third point C to a fourth point D located on said one edge of the cylinder 61 and having a phase which is intermediate between those of the second and third points B and C, and a fourth segment 65 extending across said one end face of the cylinder 61 from the point D to a fifth point E which is located on the same edge as point D and having a phase which is advanced relative to third point C. Point E defines the starting point for the next turn of the coil. As a consequence, the cylindrical portion of the coil is formed by the first, second and third segments 62, 63 and 64 while the closed end face of the coil is formed by the fourth segment 65. It is to be understood that the fifth point E may be phase advanced relative to the first point A by an angle which is either less than or greater than 360°.

Figure 8:
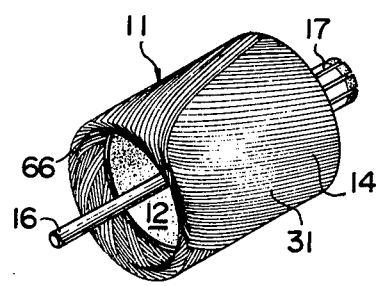
FIG. 8 is a perspective view of the completed coil assembly.

FIG. 8 shows the completed cup-shaped coil assembly 11. As shown, the assembly 11 includes an open end 66 which is formed by the enlarged opening 44 in the coil. As a consequence, the skew angle of the wire 31 in the open region 61 is less than the skew angle on the cylindrical member 12, and the wire density is increased. When this region is located above the permanent magnet 18 of the stator, adverse influences may be caused upon the torque being produced and the current waveform as a consequence of skew disturbances. To accommodate for this difficulty, in accordance with the invention, the cap member 41 is fitted into the cylindrical member 12 so as to project a length l from the edge thereof in order to limit the skew disturbances resulting from the enlargement to the region of the length l while allowing a uniform magnetic field to be produced across the coil 14 which is distributed over the cylindrical member 12. Where the coil 14 has an increased number of turns, the bonding of the wires may preferably be performed over the coil portion distributed over the cylindrical member 12 before the coil is mounted in the enlarging apparatus.

Figure 9:
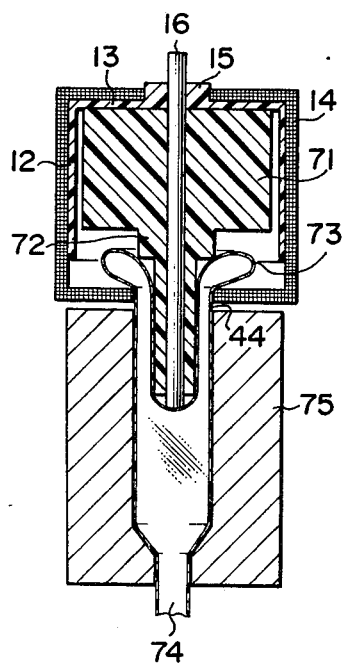
FIG. 9 is a longitudinal section of another form of enlarging apparatus.

FIG. 9 shows another form of enlarging apparatus which is constructed as an air mat type. As before, an opening 44 is formed in the coil 14 by a boss 72 of a cap member 71, and an air-tight bag 73 formed rubber or synthetic resin is inserted into the opening 44. Compressed air is supplied into the bag through an opening 74 to expand it in order to enlarge the opening 44. In this instance, the bag 73 is received in a hollow support 75 so as to restrict the expansion, which occurs by virtue of the compressed air being supplied, to the region of the opening 44. The cap member 71, which corresponds to the cap member 41 mentioned previously, has an axial length such that it fills the internal space over the majority of the cylindrical member 12 when it is moved into abutment against the disc 13, thus avoiding an influence of the expansion of the bag 73 upon the cylindrical member 12. As shown, the cap member 71 covers the substantial length of the shaft 16 in order to prevent the bag 73 from being ruptured by the shaft.

As a further alternative, the enlarging means may comprise jaws which can be diametrically moved to expand the opening 44 in the coil 14. Additionally, a spatula may be moved manually around the opening 44 to enlarge it.

Figure 10:
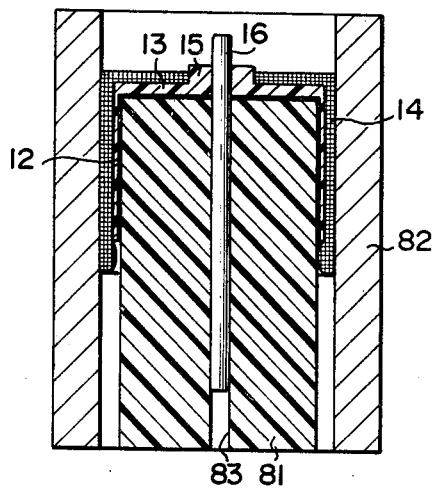
FIG. 10 is a longitudinal section of a shaping apparatus.

FIG. 10 shows another form of shaping apparatus, which comprises an inner arbor 81 adapted to be inserted inside the cylindrical member 12, and an outer ring 82 which is tightly fitted over the outer periphery of the coil 14. The arbor 81 is initially inserted into the cylindrical member 12 to provide a solid internal support therefor, and then the ring 82 is fitted from above, as viewed in FIG. 10, over the coil 14, thus shaping it. It is to be noted that an axial bore 83 is formed in the arbor 81 to receive the output shaft 16.

Figure 11:
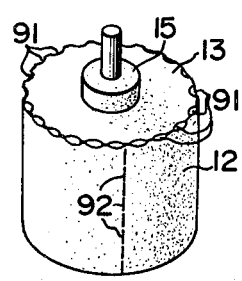
FIG. 11 is a perspective view of another form of coil bobbin assembly.

In the described embodiment, the coil bobbin assembly 42 is formed as an integral structure including the cylindrical member 12 and the disc 13. However, they can be detachably constructed so that the cylindrical member 12 may be removed after the cap member 41 has been removed, thus providing a bobbin-free coil. FIG. 11 shows an example therefor. Specifically, a number of small holes 91 are formed in the boundary region between the member 12 and disc 13 in close succession, and the member 12 is also formed with axial series of small holes 92, so that subsequent to the removal of the cap member 41, a cut may be formed in the member 12 along parting line defined by the holes 92 and then the disc removed from the member 12 by breaking through the holes 91. Alternatively, cylindrical member 12 and disc 13 may be formed as separate members which are temporarily bonded together with an adhesive of a reduced bonding strength so that they can be separated and removed together with the cap member 41.

Instead of bonding the wires of coil 14 together with an adhesive, a self-fusing wire may be used for the coil wire 31. When such wire is used, it is energized when the coil is placed in the shaping apparatus as shown in FIG. 9, thus heating the wire for fusion thereof. Alternatively, a self-fusing wire 31 may be used with its adhesive layer being melted in a solvent for purpose of subsequent bonding after the completion of the shaping step. As a further alternative, the outer periphery may be secured together with adhesive tape or heat-shrinkable tube. Where a bobbin-free coil assembly is desired, the coil may be integrally bonded together as by a molding process.

From the foregoing discussions, it will be understood that in accordance with the invention, a cylindrical coil bobbin assembly having its opposite ends closed is formed by cylindrical member, disc and cap member, and a skewed winding is formed thereon which is closed at its opposite ends by the coil wire. In this manner, a continuous winding can be applied mechanically in the similar manner as the conventional motor winding. In addition, the assembly is greatly facilitated while assuring a winding accuracy which contributes to the stabilization of the torque being produced.

What is claimed is:

1. A method of manufacturing a cup-shaped coil assembly for an electric motor which includes a cup-shaped coil having its one end left open and its other end closed by a coil wire and also including an output shaft which extends through the coil in the axial direction thereof; the method comprising the steps of
   (a) assembling a coil bobbin assembly which includes a cylindrical member, a disc connected with one end of the cylindrical member to close it, a cap member adapted to be fitted into an opening in the other end of the cylindrical member, and an output shaft disposed in alignment with the axis of the cylindrical member and having its one end mounted in the disc and its other end extending through the cap member, the disc and the cap member being centrally formed with an outwardly projecting boss,
   (b) providing a skewed winding of wire around the boss of the disc and the boss of the cap member to thereby form a coil,
   (c) moving the cap member into the cylindrical member to leave an opening in one end face of the coil which is created by the boss of the cap member,
   (d) enlarging the opening outwardly to provide an open end of the coil, and
   (e) removing the cap member from the coil.

2. A method according to claim 1, further including the step of
   (f) fitting a shaping jig over the coil to shape it, the shaping jig comprising an inner cylindrical arbor having a diameter which is slightly less than the inner diameter of the cylindrical member and having a bore formed therein in alignment with the axis thereof, and an outer cylindrical ring of an inner diameter which is slightly greater than the outer diameter of the coil, the arbor being inserted into the cylindrical member before the outer ring is fitted over the coil to shape the latter.

3. A method according to claim 2 in which the coil is formed of a wire having a self-fusing coating, the shaping step comprising energizing the coil to fuse the coating together while maintaining the shaping jig fitted on the coil, thereby bonding the coil together.

4. A method according to claim 2, further including the step of bonding the coil together with an adhesive which does not attack an insulating film on the wire.

5. A method according to claim 1 in which the step of assembling the bobbin assembly comprises positioning the cap member so that it projects outwardly from the open end of the cylindrical member.

6. A method according to claim 1 in which the enlarging step comprises providing a shaping apparatus which includes a rotatable member, and a shaping member which is adapted to rotate with the rotatable member and is movable in a direction perpendicular to the axis of rotation of the member, fitting the shaping member in the opening, and moving the shaping member while rotating the member, thus enlarging the opening to provide an open end of the coil.

7. A method according to claim 1 in which the enlarging step comprises inserting an air-tight bag of a flexible material into the coil through the opening, and injecting compressed air into the bag to inflate it, thus providing an open end of the coil.

8. A method to claim 1 in which the removing step removes the cylindrical member together with the cap member.

* * * * *